US009239195B2

(12) United States Patent
Kim et al.

(10) Patent No.: US 9,239,195 B2
(45) Date of Patent: Jan. 19, 2016

(54) HEAT EXCHANGER FOR VEHICLE

(75) Inventors: Jae Yeon Kim, Hwaseong-si (KR); Wan Je Cho, Suwon-si (KR); Young Jun Kim, Suwon-si (KR); Yong Woong Cha, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 826 days.

(21) Appl. No.: 13/315,941

(22) Filed: Dec. 9, 2011

(65) Prior Publication Data

US 2012/0273177 A1    Nov. 1, 2012

(30) Foreign Application Priority Data

Apr. 26, 2011 (KR) .................. 10-2011-0038972
Jul. 20, 2011 (KR) .................. 10-2011-0072025

(51) Int. Cl.
*F28D 9/00* (2006.01)
*F28D 21/00* (2006.01)
*F28F 27/02* (2006.01)
*F28B 1/02* (2006.01)
*F01P 7/16* (2006.01)
*G05D 23/02* (2006.01)

(52) U.S. Cl.
CPC . *F28D 9/005* (2013.01); *F01P 7/16* (2013.01); *F28B 1/02* (2013.01); *F28D 2021/0089* (2013.01); *F28F 27/02* (2013.01); *F28F 2250/06* (2013.01); *G05D 23/02* (2013.01)

(58) Field of Classification Search
CPC .............. F28F 27/02; F28B 1/02; F01P 7/16; G05D 23/02

USPC ........ 165/103, 167, 101, 297, 280, 283, 276, 165/277, 287; 236/34.5, 101 R, 101 D; 65/259.2

See application file for complete search history.

(56) References Cited

U.S. PATENT DOCUMENTS 4,336,903 A * 6/1982 Zirps .......................... 236/92 R
5,078,173 A * 1/1992 Spencer et al. ............ 137/115.1
5,950,715 A * 9/1999 Jonsson et al. ................ 165/103

(Continued)

FOREIGN PATENT DOCUMENTS

CN        1357699 A       7/2002
EP      1 348 846 A2    10/2003

(Continued)

*Primary Examiner* — M. Alexandra Elve
*Assistant Examiner* — Joel Attey
(74) *Attorney, Agent, or Firm* — Morgan, Lewis & Bockius LLP

(57) ABSTRACT

A heat exchanger for a vehicle may include a heat radiating portion provided with first and second connecting lines formed alternately by stacking plates, and receiving first and second operating fluids into the first and second connecting lines. The heat exchanger also includes a bifurcating portion connecting an inflow hole for flowing one operating fluid of the first and second operating fluids with an exhaust hole for exhausting the one operating fluid, and the bifurcating portion is adapted for the one operating fluid to bypass the heat radiating portion according to a temperature of the one operating fluid. The heat exchanger further includes a valve unit mounted corresponding to the inflow hole and adapted to flow the one operating fluid selectively to the heat radiating portion or the bifurcating portion according to the temperature of the one operating fluid flowing in the inflow hole.

14 Claims, 13 Drawing Sheets

(56) References Cited

U.S. PATENT DOCUMENTS

| | | | | |
|---|---|---|---|---|
| 6,125,872 | A * | 10/2000 | Cunkelman et al. | 137/75 |
| 6,182,749 | B1 * | 2/2001 | Brost et al. | 165/297 |
| 6,220,340 | B1 * | 4/2001 | Cheong et al. | 165/103 |
| 6,843,211 | B2 * | 1/2005 | Iwasaki | 123/41.31 |
| 7,198,037 | B2 * | 4/2007 | Sayers et al. | 123/568.12 |
| 7,748,442 | B2 * | 7/2010 | Kalbacher et al. | 165/299 |
| 2002/0069655 | A1 * | 6/2002 | Lee et al. | 62/222 |
| 2004/0134650 | A1 * | 7/2004 | Acre | 165/297 |
| 2006/0076129 | A1 * | 4/2006 | Eliades et al. | 165/297 |
| 2006/0124114 | A1 | 6/2006 | Sayers et al. | |
| 2007/0158059 | A1 * | 7/2007 | Pineo et al. | 165/297 |
| 2008/0029246 | A1 * | 2/2008 | Fratantonio et al. | 165/103 |
| 2008/0093066 | A1 * | 4/2008 | Bird et al. | 165/297 |
| 2008/0110605 | A1 * | 5/2008 | Richter | 165/167 |
| 2008/0179051 | A1 * | 7/2008 | Willis et al. | 165/173 |
| 2010/0175640 | A1 * | 7/2010 | Sheppard | 123/41.09 |

FOREIGN PATENT DOCUMENTS

| | | |
|---|---|---|
| JP | 58-121378 A | 7/1983 |
| JP | 58-148480 U | 10/1983 |
| JP | 1-80612 U | 5/1989 |
| JP | 2-211324 A | 8/1990 |
| JP | 3-225022 A | 10/1991 |
| JP | 9-250322 A | 9/1997 |
| JP | 2001-508163 A | 6/2001 |
| JP | 2003-286846 A | 10/2003 |
| JP | 2007-046808 | 2/2007 |
| KR | 1019990069055 | 9/1999 |
| KR | 10-2010-0060638 A | 6/2010 |
| WO | WO 97/00415 A1 | 1/1997 |

* cited by examiner

HEAT EXCHANGER FOR VEHICLE

CROSS-REFERENCE TO RELATED APPLICATION

The present application claims priority to Korean Patent Application No. 10-2011-0072025 and No. 10-2011-0038972 filed in the Korean Intellectual Property Office respectively on Jul. 20, 2011 and Apr. 26, 2011, the entire contents of which is incorporated herein for all purposes by this reference.

BACKGROUND OF THE INVENTION

1. Field of the Invention

The present invention relates to a heat exchanger for a vehicle. More particularly, the present invention relates to a heat exchanger for a vehicle which can control temperatures of at least two operating fluids flowing into the heat exchanger.

2. Description of Related Art

Generally, a heat exchanger transfers heat from high-temperature fluid to low-temperature fluid through a heat transfer surface, and is used in a heater, a cooler, an evaporator, and a condenser.

Such a heat exchanger reuses heat energy or controls a temperature of an operating fluid flowing therein for demanded performance. The heat exchanger is applied to an air conditioning system or a transmission oil cooler of a vehicle, and is mounted at an engine compartment.

Since the heat exchanger is hard to be mounted at the engine compartment with restricted space, studies for the heat exchanger with smaller size, lighter weight, and higher efficiency have been developed.

A conventional heat exchanger controls the temperatures of the operating fluids according to a condition of a vehicle and supplies the operating fluids to an engine, a transmission, or an air conditioning system. For this purpose, bifurcation circuits and valves are mounted on each hydraulic line through which the operating fluids operated as heating medium or cooling medium passes. Therefore, constituent elements and assembling processes increase and layout is complicated.

If additional bifurcation circuits and valves are not used, heat exchanging efficiency cannot be controlled according to flow amount of the operating fluid. Therefore, the temperature of the operating fluid cannot be controlled efficiently.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a heat exchanger for a vehicle having advantages of simultaneously warming up and cooling operating fluids according to temperatures of the operating fluids at a running state or an initial starting condition of the vehicle when the operating fluids are heat exchanged with each other in the heat exchanger.

Various aspects of the present invention are directed to providing a heat exchanger for a vehicle having further advantages of improving fuel economy and heating performance by controlling the temperatures of the operating fluids according to a condition of the vehicle.

A heat exchanger for a vehicle according to one or more exemplary embodiments of the present invention may include a heat radiating portion provided with first and second connecting lines formed alternately by stacking a plurality of plates, and receiving first and second operating fluids into the first and second connecting lines, the first and second operating fluids heat-exchanging with each other during passing through the first and second connecting lines, a bifurcating portion connecting an inflow hole for flowing one operating fluid of the first and second operating fluids with an exhaust hole for exhausting the one operating fluid, and adapted for the one operating fluid to bypass the heat radiating portion according to a temperature of the one operating fluid, and a valve unit mounted corresponding to the inflow hole and adapted to flow the one operating fluid selectively to the heat radiating portion or the bifurcating portion according to the temperature of the one operating fluid flowing in the inflow hole.

In one or more exemplary embodiments, the first operating fluid flows into the heat radiating portion through a first inflow hole and flows out from the heat radiating portion through a first exhaust hole, and the first inflow hole is connected to the first exhaust hole through the first connecting line.

In one or more exemplary embodiments, the second operating fluid flows into the heat radiating portion through a second inflow hole and flows out from the heat radiating portion through a second exhaust hole, and the second inflow hole is connected to the second exhaust hole through the second connecting line.

In one or more exemplary embodiments, the first and second inflow holes are formed at both sides of a surface of the heat radiating portion along a length direction, and the first and second exhaust holes are distanced from the first and second inflow holes and are formed at the both sides of the surface of the heat radiating portion along the length direction.

In one or more exemplary embodiments, the bifurcating portion connects the first inflow hole with the first exhaust hole, and is protruded from a surface of the heat radiating portion.

In one or more exemplary embodiments, the first inflow hole and the first exhaust hole are formed at corner portions of the surface of the heat radiating portion facing diagonally with each other.

In one or more exemplary embodiments, the second inflow hole and the second exhaust hole are formed at corner portions of the surface of the heat radiating portion at which the first inflow hole and the first exhaust hole are not positioned and which face diagonally with each other.

In one or more exemplary embodiments, the first operating fluid is a coolant coming from a radiator and the second operating fluid is a transmission oil coming from an automatic transmission.

In one or more exemplary embodiments, the coolant circulates through the first inflow hole, the first connecting line, and the first exhaust hole, and the transmission oil circulates through the second inflow hole, the second connecting line, and the second exhaust hole.

In one or more exemplary embodiments, the bifurcating portion is provided with a bypass line adapted to flow the coolant flowing in the bifurcating portion through the first inflow hole to the first exhaust hole directly.

In one or more exemplary embodiments, the valve unit may include a mounting cap fixedly mounted at the other end of the heat radiating portion corresponding to the first inflow hole, and a deformable member inserted in the mounting cap and adapted to extend or contract according to the temperature of the operating fluid.

In one or more exemplary embodiments, the deformable member is made from shape memory alloy adapted to extend or contract according to the temperature of operating fluid.

In one or more exemplary embodiments, the deformable member may include a pair of fixed portions positioned at both sides thereof in a length direction and adapted not to being deformed according to the temperature, and a deformable portion disposed between the pair of fixed portions and adapted to extend or contract according to the temperature of the operating fluid.

In one or more exemplary embodiments, the deformable member is formed by overlapping and contacting a plurality of ring members with each other in a coil spring shape.

In one or more exemplary embodiments, the mounting cap may include a mounting portion fixedly mounted at the heat radiating portion, and a guide portion extending from the mounting portion toward the first inflow hole and adapted to guide the deformable member in a case that the deformable member inserted therein is deformed.

In one or more exemplary embodiments, a screw is formed at an exterior circumference of the mounting portion so as to be threaded to the heat radiating portion.

In one or more exemplary embodiments, at least one of through-holes is formed at an exterior circumference of the guide portion.

In one or more exemplary embodiments, the heat exchanger may further include a sealing for preventing the operating fluid passing through the heat radiating portion from leaking to the exterior, wherein the sealing is mounted between the mounting portion and the guide portion.

In one or more exemplary embodiments, the heat radiating portion heat-exchanges the first and second operating fluids by counterflow of the first and second operating fluids.

In one or more exemplary embodiments, the heat radiating portion is a heat radiating portion of plate type where a plurality of plates is stacked.

A heat exchanger for a vehicle according to another aspect of the present invention may include a heat radiating portion provided with first and second connecting lines formed alternately by stacking a plurality of plates, and receiving first and second operating fluids into the first and second connecting lines, the first and second operating fluids heat-exchanging with each other during passing through the first and second connecting lines, and a bifurcating portion connecting an inflow hole for flowing one operating fluid of the first and second operating fluids with an exhaust hole for exhausting the one operating fluid, and adapted for the one operating fluid to bypass the heat radiating portion according to a flow amount of the one operating fluid.

In one or more exemplary embodiments, the first operating fluid flows into the heat radiating portion through a first inflow hole and flows out from the heat radiating portion through a first exhaust hole, and the first inflow hole is connected to the first exhaust hole through the first connecting line.

In one or more exemplary embodiments, the second operating fluid flows into the heat radiating portion through a second inflow hole and flows out from the heat radiating portion through a second exhaust hole, and the second inflow hole is connected to the second exhaust hole through the second connecting line.

In one or more exemplary embodiments, the first and second inflow holes are formed at both sides of a surface of the heat radiating portion along a length direction. In addition, the first and second exhaust holes are distanced from the first and second inflow holes and are formed at the both sides of the surface of the heat radiating portion along the length direction.

In one or more exemplary embodiments, the bifurcating portion connects the first inflow hole with the first exhaust hole, and is protruded from a surface of the heat radiating portion.

In one or more exemplary embodiments, the first operating fluid is a coolant coming from a radiator and the second operating fluid is a transmission oil coming from an automatic transmission.

In one or more exemplary embodiments, the coolant circulates through the first inflow hole, the first connecting line, and the first exhaust hole, and the transmission oil circulates through the second inflow hole, the second connecting line, and the second exhaust hole.

In one or more exemplary embodiments, the bifurcating portion is provided with a bypass line adapted to flow the coolant flowing in the bifurcating portion through the first inflow hole to the first exhaust hole directly.

In one or more exemplary embodiments, the heat radiating portion heat-exchanges the first and second operating fluids by counterflow of the first and second operating fluids.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
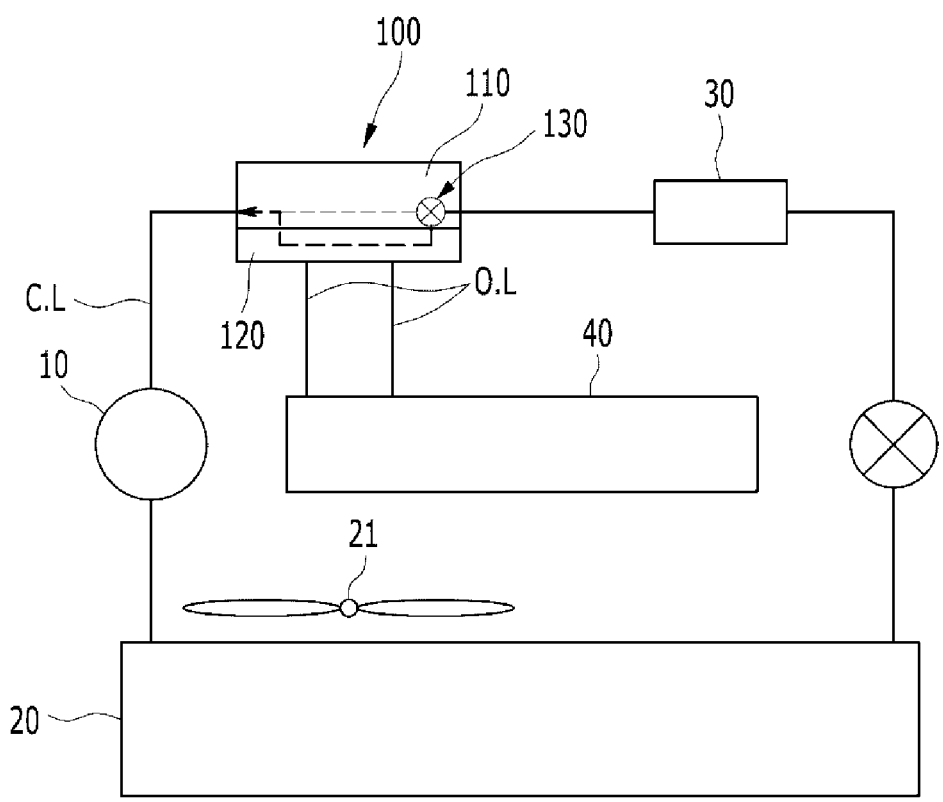
FIG. 1 is a schematic diagram of a cooling system of an automatic transmission to which a heat exchanger for a vehicle according to an exemplary embodiment of the present invention is applied.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Exemplary embodiments described in this specification and drawings are just exemplary embodiments of the present invention. It is to be understood that there can be various modifications and equivalents included in the spirit of the present invention at the filing of this application.

Figure 2:
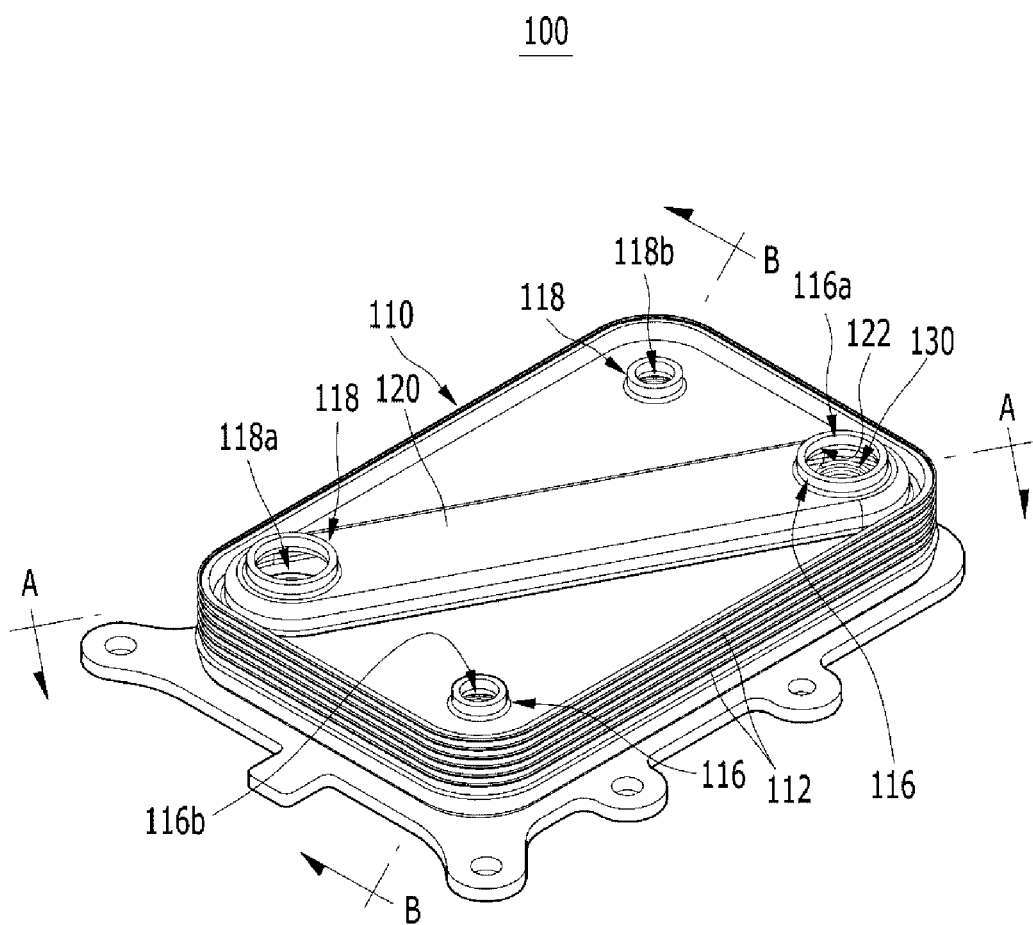
FIG. 2 is a perspective view of a heat exchanger for a vehicle according to an exemplary embodiment of the present invention.
Figure 3:
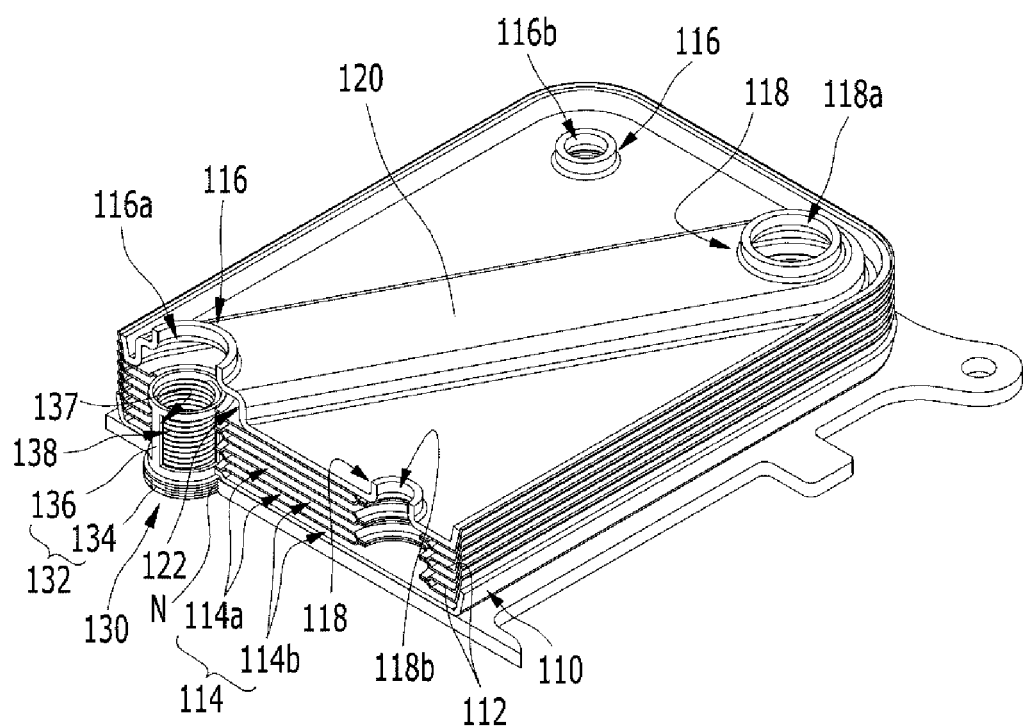
FIG. 3 is a partially cut-away perspective view of a heat exchanger for a vehicle according to an exemplary embodiment of the present invention.
Figure 4:
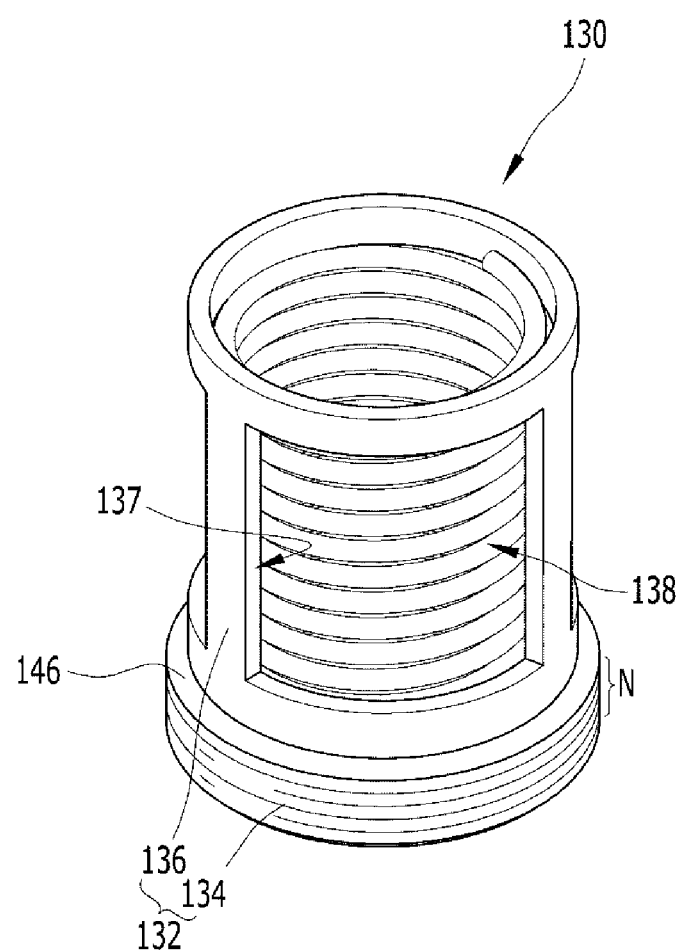
FIG. 4 is a cross-sectional view taken along the line A-A in FIG. 2.
Figure 5:
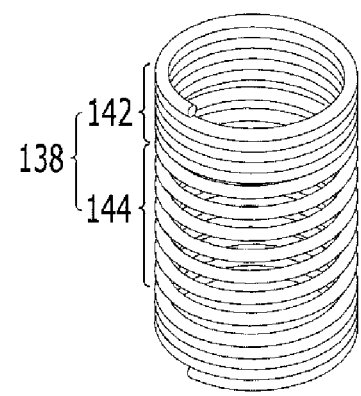
FIG. 5 is a cross-sectional view taken along the line B-B in FIG. 2.
Figure 5:
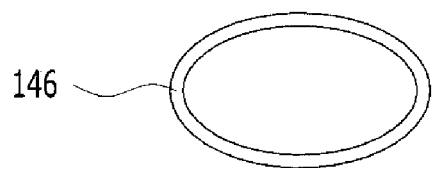
Figure 5:
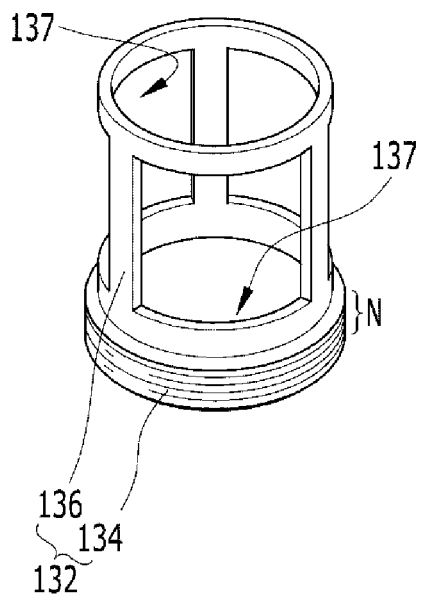
Figure 6:
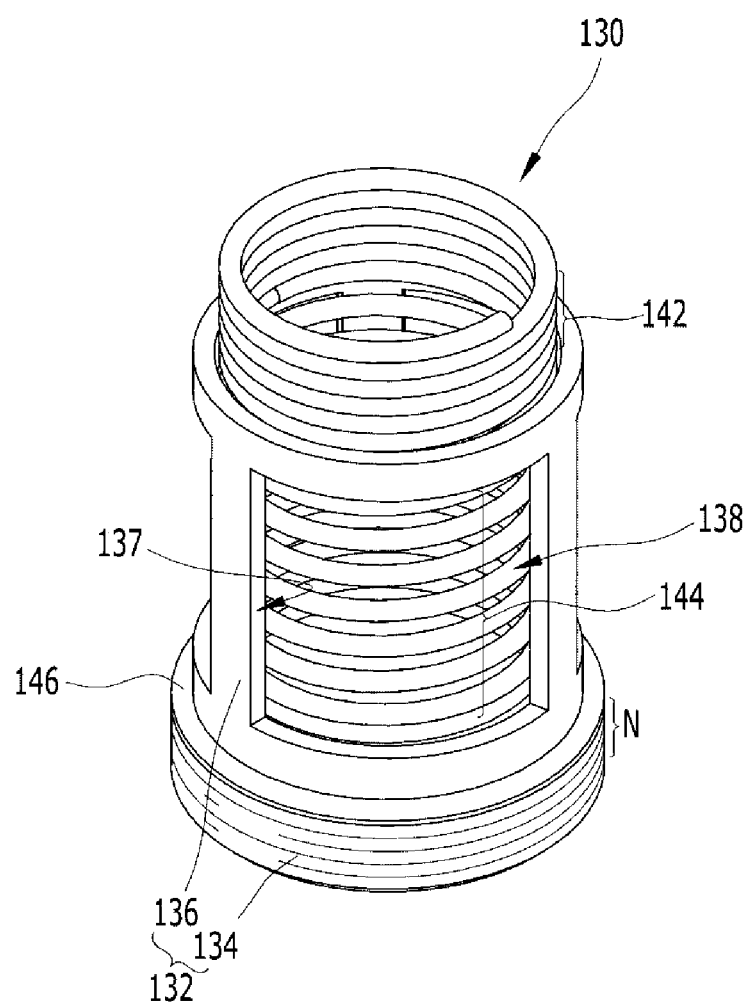
FIG. 6 is a perspective view of a valve unit used in a heat exchanger for a vehicle according to an exemplary embodiment of the present invention.
Figure 7:
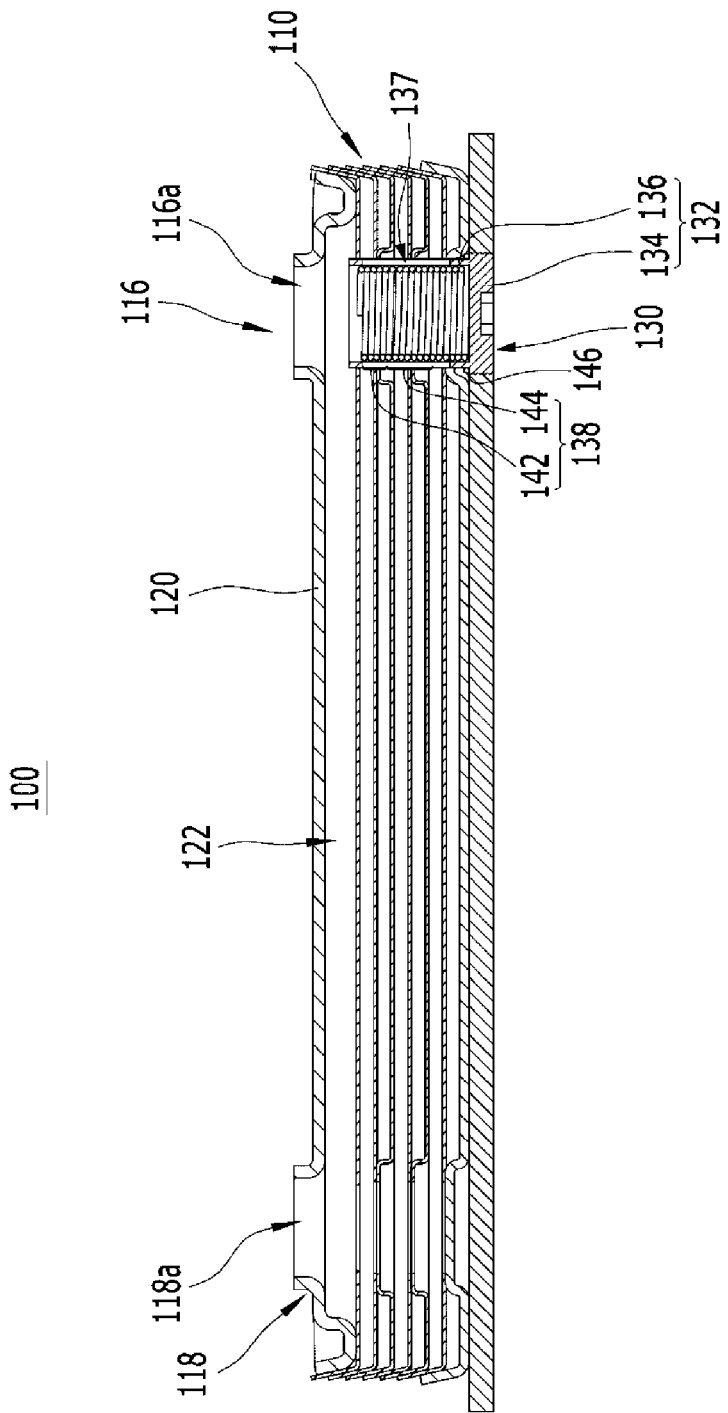
FIG. 7 is an exploded perspective view of a valve unit according to an exemplary embodiment of the present invention.

FIG. 1 is a schematic diagram of a cooling system of an automatic transmission to which a heat exchanger for a vehicle according to an exemplary embodiment of the present invention is applied, FIG. 2 is a perspective view of a heat exchanger for a vehicle according to an exemplary embodiment of the present invention, FIG. 3 is a partially cut-away perspective view of a heat exchanger for a vehicle according to an exemplary embodiment of the present invention, FIG. 4 is a cross-sectional view taken along the line A-A in FIG. 2, FIG. 5 is a cross-sectional view taken along the line B-B in FIG. 2, FIG. 6 is a perspective view of a valve unit used in a heat exchanger for a vehicle according to an exemplary embodiment of the present invention, and FIG. 7 is an exploded perspective view of a valve unit according to an exemplary embodiment of the present invention.

Referring to the drawings, a heat exchanger 100 for a vehicle according to an exemplary embodiment of the present invention applies to a cooling system of an automatic transmission for a vehicle.

The cooling system of the automatic transmission, as shown in FIG. 1, is provided with a cooling line C.L. for cooling an engine. A coolant passes through the radiator 20 having a cooling fan 21 through a water pump 10 and is cooled by the radiator 20. A heater core 30 connected to a heating system of the vehicle is mounted at the cooling line C.L.

A heat exchanger 100 for a vehicle according to an exemplary embodiment of the present invention warms up or cools operating fluids according to temperatures of the operating fluids flowing in at a running state or an initial starting condition of the vehicle when the temperatures of the operating fluids are controlled in the heat exchanger 100 through heat exchange.

For this purpose, the heat exchanger 100 for a vehicle according to an exemplary embodiment of the present invention is disposed between the water pump 10 and the heater core 30, and is connected to an automatic transmission 40 through an oil line O.L.

That is, the operating fluids includes a coolant flowing from the radiator 20 and a transmission oil flowing from the automatic transmission 40 according to the present exemplary embodiment. The coolant and the transmission oil are heat exchanged with each other in the heat exchanger 100 such that a temperature of the transmission oil is controlled.

The heat exchanger 100, as shown in FIG. 2 and FIG. 3, includes a heat radiating portion 110, a bifurcating portion 120, and a valve unit 130, and the heat radiating portion 110, the bifurcating portion 120, and the valve unit 130 will be described in detail.

The heat radiating portion 110 is formed by stacking a plurality of plates 112, and a plurality of connecting lines 114 is formed between the neighboring plates 112. In addition, the coolant flows through one of the neighboring connecting lines 114, and the transmission oil flows through the other of the neighboring connecting lines 114. At this time, heat is exchanged between the coolant and the transmission oil.

The heat radiating portion 110 exchanges heat between the coolant and the transmission oil through counterflow of the coolant and the transmission oil.

The heat radiating portion 110 is a heat radiating portion of plate type (or disk type) where the plurality of plates 112 is stacked.

In addition, the bifurcating portion 120 connects one of inflow holes 116 for flowing the operating fluids into the heat radiating portion 110 with one of exhaust holes 118 for discharging the operating fluids from the heat radiating portion 110, and is mounted at an exterior of the heat radiating portion 110. The bifurcating portion 120 is configured for the operating fluid to bypass the heat radiating portion 110 by the valve unit 130 operated according to the temperature of the operating fluid.

The inflow holes 116 includes first and second inflow holes 116a and 116b formed at both sides of a surface of the heat radiating portion 110 along a length direction according to the present exemplary embodiment.

In addition, the exhaust holes 118 includes first and second exhaust holes 118a and 118b formed at the both sides of the surface of the heat radiating portion 110 along the length direction. The first and second exhaust holes 118a and 118b correspond to the first and second inflow holes 116a and 116b and are distanced from the first and second inflow holes 116a and 116b. The first and second exhaust holes 118a and 118b are connected respectively to the first and second inflow holes 116a and 116b through the respective connecting line 114 in the heat radiating portion 110.

The first inflow hole 116a and the first exhaust hole 118a are formed at corner portions of the surface of the heat radiating portion 110 diagonally.

The second inflow hole 116b and the second exhaust hole 118b are formed at corner portions of the surface of the heat radiating portion 110 diagonally, and confronts respectively with the first inflow hole 116a and the first exhaust hole 118a.

The bifurcating portion 120 connects the first inflow hole 116a with the first exhaust hole 118a, and is protruded from the surface of the heat radiating portion 110.

According to the present exemplary embodiment, the coolant circulates through the first inflow hole 116a and the first exhaust hole 118a, and the transmission oil circulates through the second inflow hole 116b and the second exhaust hole 118b.

Connecting ports are mounted respectively at the first inflow hole 116a and the first exhaust hole 118a, and are connected to the radiator 20 through connecting hoses connected to the connecting ports. In addition, connecting ports are mounted respectively at the second inflow hole 116b and the second exhaust hole 118b, and are connected to the automatic transmission 40 through connecting hoses connected to the connecting ports.

The connecting line 114, as shown in FIG. 4 and FIG. 5, includes a first connecting line 114a through which the coolant flows and a second connecting line 114b through with the transmission oil passes according to the present exemplary embodiment. The first connecting line 114a and the second connecting line 114b are formed alternately.

The bifurcating portion 120 includes a bypass line 122. The bypass line 122 is adapted to exhaust the coolant flowing in the bifurcating portion 120 through the first inflow hole 116a to the first exhaust hole 118a directly.

In addition, the valve unit 130 is mounted at the heat radiating portion 110 corresponding to the first inflow hole 116a, and flows the coolant to the heat radiating portion 110 or to the bypass line 122 according to the temperature of the coolant.

The valve unit 130, as shown in FIG. 6 and FIG. 7, includes a mounting cap 132 and a deformable member 138, and the mounting cap 132 and the deformable member 138 will be described in detail.

The mounting cap 132 is fixedly mounted at the other surface of the heat radiating portion 110 corresponding to the first inflow hole 116a.

The mounting cap 132 includes a mounting portion 134 fixedly mounted at the heat radiating portion 110 and a guide portion 136 extending from the mounting portion 134 toward the first inflow hole 116a. The deformable member 138 is inserted in the guide portion 136. The guide portion 136 guides the deformable member 138 when the deformable member 138 extends or contracts.

A screw N is formed at an exterior circumference of the mounting portion 134 such that the mounting portion 134 is threaded to an interior circumference of the heat radiating portion 110, and tab forming corresponding to the screw N is performed at the interior circumference of the other surface of the heat radiating portion 110 corresponding to the first inflow hole 116a.

In addition, at least one of through-hole 137 is formed at an exterior circumference of the guide portion 136. The through-hole 137 is configured so that the coolant flowed in the extended deformable member 138 flows to the first connecting line 114a of the heat radiating portion 110 smoothly.

According to the present exemplary embodiment, a sealing 146 is mounted at the mounting cap 132 so as to prevent the coolant from being leaked. The sealing 146 may be mounted between the mounting portion 134 and the guide portion 136.

That is, the sealing 146 seals a gap between the interior circumference of the heat radiating portion 110 and the exterior circumference of the mounting portion 134 such that the operating fluid is prevented from being leaked to the exterior of the heat radiating portion 110 along the screw N of the mounting portion 134 threaded to the heat radiating portion 110.

In addition, the deformable member 138 is inserted in the guide portion 136 of the mounting cap 132, and extends or contracts according to the temperature of the coolant flowed into the first inflow hole 116a.

The deformable member 138 can be made from shape memory alloy that can extend or contract according to the temperature of the operating fluid.

The shape memory alloy (SMA) is alloy that remembers a shape at a predetermined temperature. The shape of the shape memory alloy can be changed at a different temperature from the predetermined temperature. If the shape memory alloy, however, is cooled or heated to the predetermined temperature, the shape memory alloy returns to an original shape.

The deformable member 138 made from the shape memory alloy material includes a pair of fixed portions 142 and a deformable portion 144, and the fixed portion 142 and the deformable portion 144 will be described in detail.

The pair of fixed portions 142 is positioned at both end portions of the deformable member 138 in a length direction, and a shape of the fixed portion does not change according to the temperature. That is, ring members forming the fixed portion 142 are fixed with each other through such as welding.

In addition, the deformable portion 144 is positioned between the fixed portion 142, and extends or contracts according to the temperature of the operating fluid. That is, ring members forming the deformable portion 144 is extendably or contractably connected to each other.

The deformable member 138 has a shape similar to that of a circular coil spring.

The deformable member 138 is inserted in the guide portion 136 of the mounting cap 132 at a contracted state, and is deformed according to the temperature of the operating fluid flowing in the deformable member 138 through the first inflow hole 116a so as to selectively open or close the first connecting line 114a.

Figure 8:
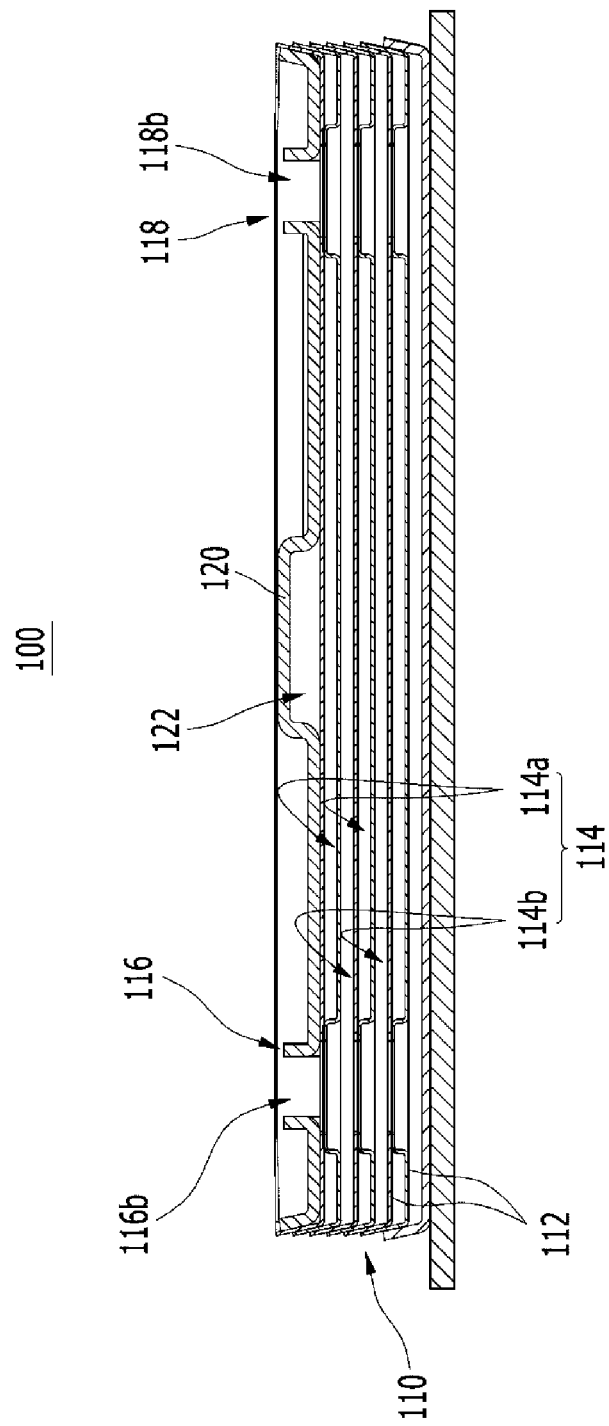
FIG. 8 is a perspective view of a valve unit at an extended state according to an exemplary embodiment of the present invention.

That is, if he operating fluid having a higher temperature than the predetermined temperature flows in the valve unit 130, the deformable portion 144 of the deformable member 138 extends, as shown in FIG. 8.

Accordingly, the ring members forming the deformable portion 144 of the deformable member 138 are distanced from each other so as to form a space S, and the operating fluid flows out through the space S.

At this time, the ring members forming the fixed portion 142 are fixed to each other, and the fixed portion 142 does not extend.

If the operating fluid having a lower temperature than the predetermined temperature flows into the first inflow hole 116a, the deformable portion 144 contracts to an original shape shown in FIG. 6 and the space S is closed.

Operation and function of the heat exchanger 100 according to an exemplary embodiment of the present invention will be described in detail.

Figure 9:
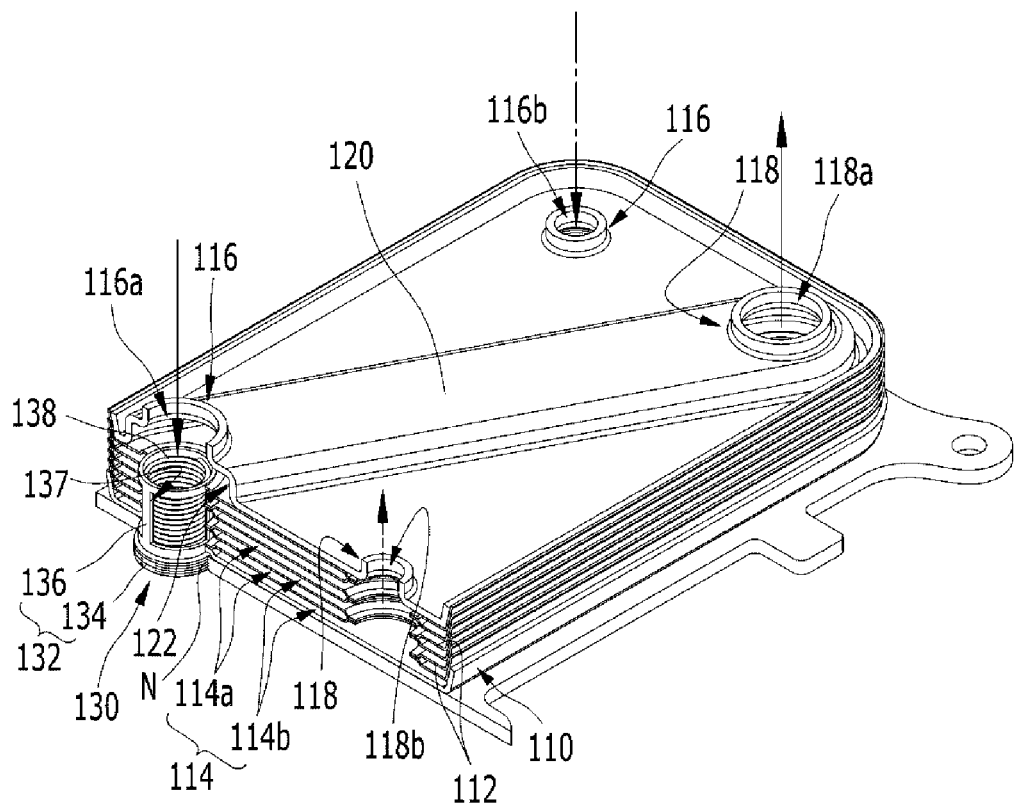
FIG. 9 to FIG. 10 are perspective and cross-sectional views for describing operation of a heat exchanger for a vehicle according to an exemplary embodiment of the present invention.
Figure 9:
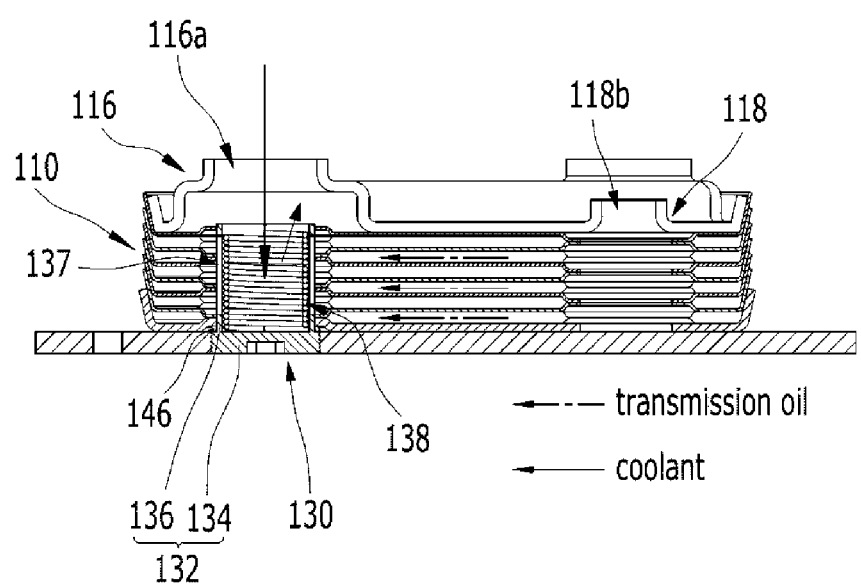
Figure 10:
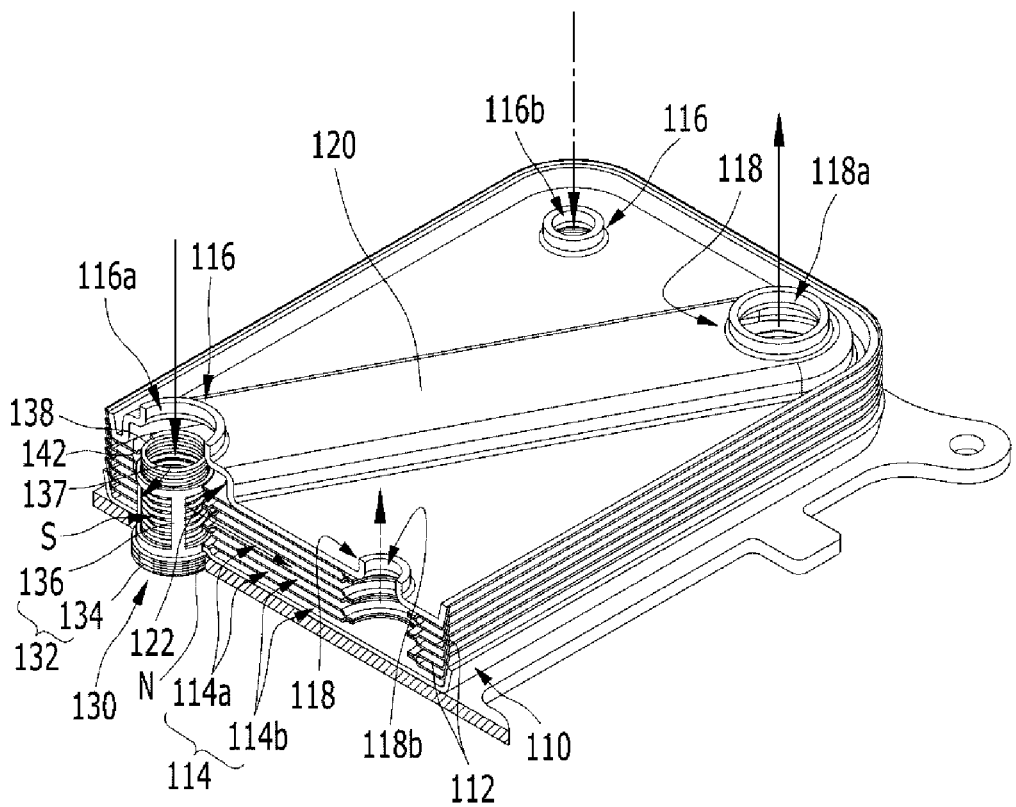
Figure 10:
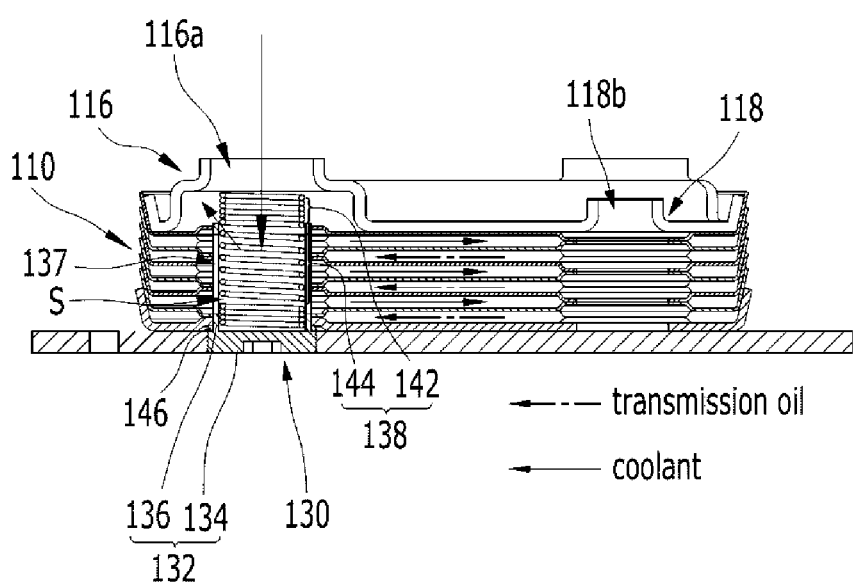

FIG. 9 to FIG. 10 are perspective and cross-sectional views for describing operation of a heat exchanger for a vehicle according to an exemplary embodiment of the present invention.

If the temperature of the coolant flowing through the first inflow hole 116a is lower than the predetermined temperature, the deformable member 138 of the valve unit 130 does not deform and maintains an original shape as shown in FIG. 9.

The coolant does not flow into the first connecting line 114a of the heat radiating portion 110, but flows directly to the first exhaust hole 118a through the bypass line 122 formed in the bifurcating portion 120.

Accordingly, the transmission oil flowing into the heat radiating portion 110 through the second inflow hole 116b and passing through the second connecting line 114b does not heat exchange with the coolant.

If the transmission oil should be warmed up according to a condition or a mode of the vehicle such as a running state, an idle mode, or an initial starting, the bypass line 122 prevents the coolant of low temperature from flowing into the first connecting line 114a. Therefore, it is prevented that the temperature of the transmission oil is lowered through heat exchange with the coolant.

If the temperature of the coolant, on the contrary, is higher than the predetermined temperature, the deformable member 138 of the valve unit 130 extends and the space S is formed between the ring members forming the deformable portion 144 as shown in FIG. 10.

The coolant passing through the first inflow hole 116a flows through the first connecting line 114a. After that, the coolant is discharged through the first exhaust hole 118a.

Therefore, the coolant passes through the first connecting line 114a of the heat radiating portion 110 and heat exchanges with the transmission oil flowing in through the second inflow hole 116b and passing through the second connecting line 114b. Therefore, the temperatures of the coolant and the transmission oil are controlled in the heat radiating portion 110.

Since the first and second inflow holes 116a and 116b are formed at the corner portions of the heat radiating portion 110 diagonally, the coolant and the transmission oil flow to opposite directions and are heat exchanged. Therefore, heat exchange is performed more efficiently.

Therefore, the transmission oil is cooled through heat exchange with the coolant in the heat radiating portion 110 and is then supplied to the automatic transmission 40.

That is, since the heat exchanger 100 supplies the cooled transmission oil to the automatic transmission 40 rotating at a high speed, occurrence of slip in the automatic transmission 40 is prevented.

If the heat exchanger 100 according to an exemplary embodiment of the present invention is applied, the operating fluids can be warmed up and cooled simultaneously by using the temperatures of the operating fluids at the running state or the initial starting condition of the vehicle. Therefore, the temperatures of the operating fluids can be controlled efficiently.

Since the temperatures of the operating fluids can be controlled according to the condition of the vehicle, fuel economy and heating performance may be improved. In addition, assembling processes may be reduced due to a simple structure.

Since additional bifurcation circuits are not needed, production cost may be curtailed and workability may be improved.

If the operating fluid is the transmission oil in the automatic transmission 40, hydraulic friction at a cold starting may be lowered due to fast warm up. In addition, slip may be prevented and durability may be maintained at driving due to excellent cooling performance. Therefore, fuel economy and durability of the transmission may be improved.

In addition, since the deformable member 138 is made from the shape memory alloy, structure of the valve unit 130 is very simple. Since the valve unit 130 performs conversion of the hydraulic lines of the operating fluid according to the temperature of the operating fluid, flow of the operating fluid can be controlled accurately. Therefore, constituent elements can be simplified and production cost may be curtailed. In addition, weight may be reduced.

Since responsiveness of the valve according to the temperature of the operating fluid is improved, flow of the operating fluid may be controlled efficiently.

It is exemplified in this specification that the coolant and the transmission oil are used as the operating fluids, but the operating fluids are not limited to these. All the operating fluids that requires warming up or cooling can be used.

In addition, the heat exchanger according to an exemplary embodiment may further include covers and brackets that prevent damage of the heat exchanger and other components or that are used for fixing the heat exchanger to other components or the engine compartment.

Figure 11:
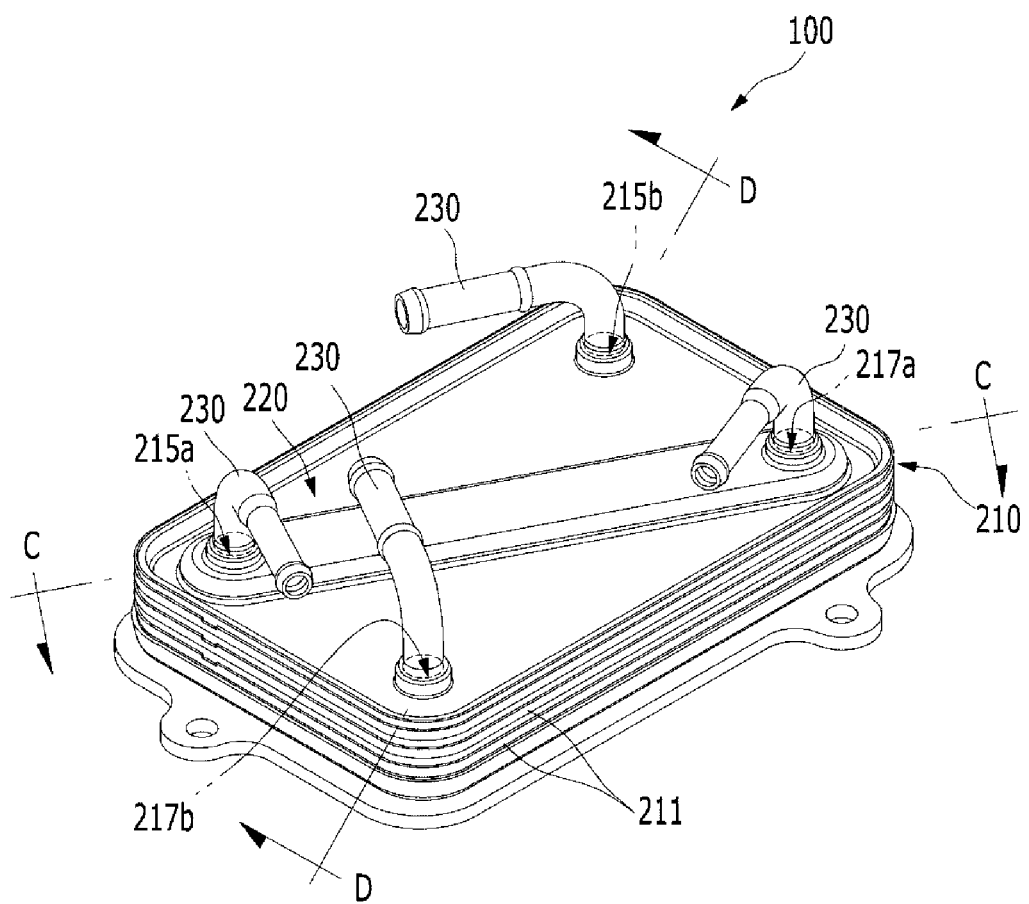
FIG. 11 is a perspective view of a heat exchanger for a vehicle according to another exemplary embodiment of the present invention.
Figure 12:
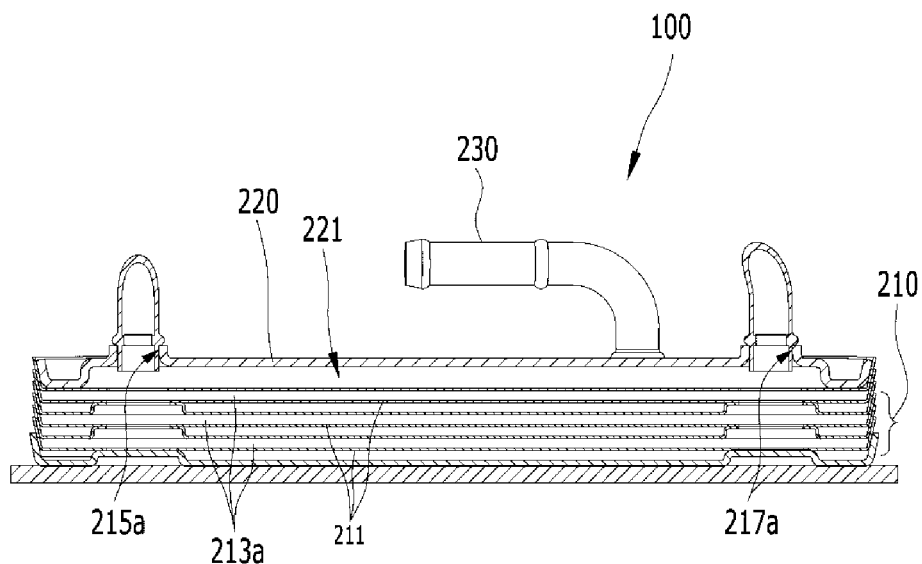
FIG. 12 is a cross-sectional view taken along the line C-C in FIG. 11.
Figure 13:
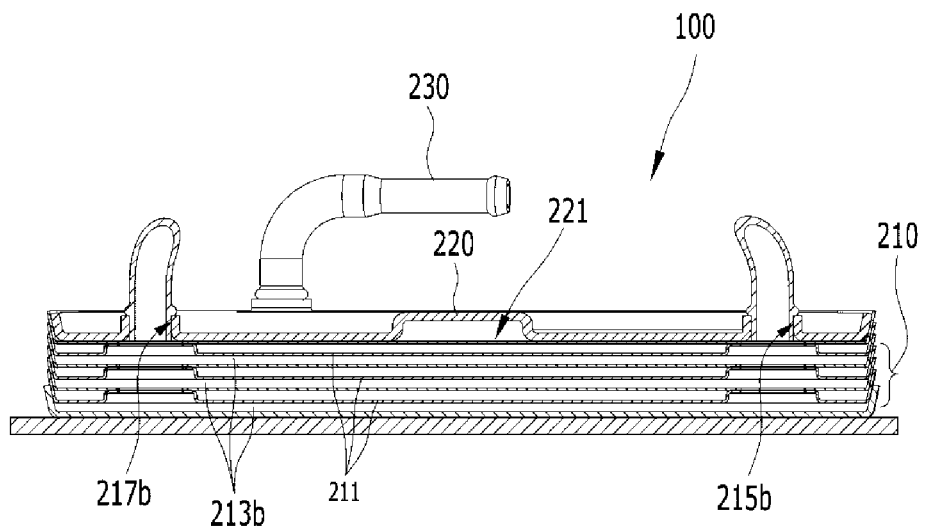
FIG. 13 is a cross-sectional view taken along the line D-D in FIG. 11.
Figure 14:
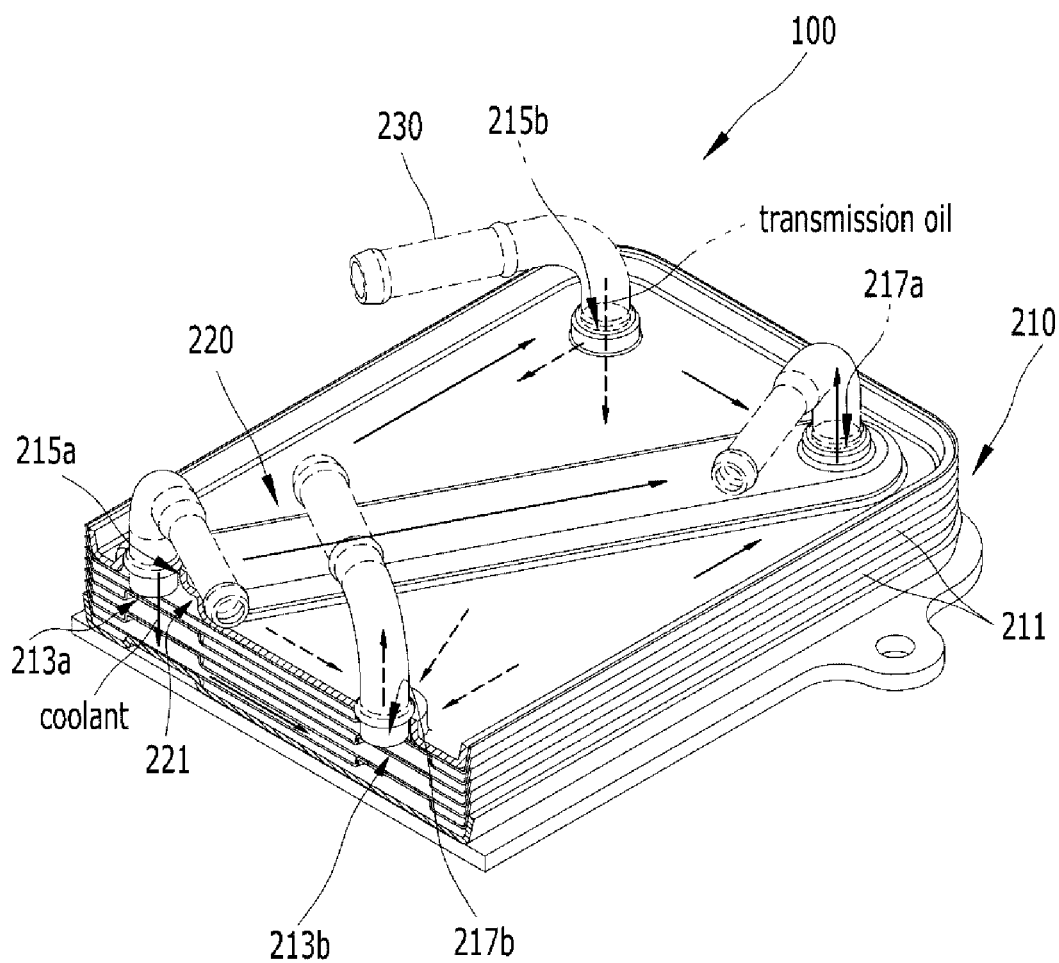
FIG. 14 is a partially cut-away perspective view of a heat exchanger for a vehicle according to another exemplary embodiment of the present invention.

FIG. 11 is a perspective view of a heat exchanger for a vehicle according to another exemplary embodiment of the present invention, FIG. 12 is a cross-sectional view taken along the line C-C in FIG. 11, FIG. 13 is a cross-sectional view taken along the line D-D in FIG. 11, and FIG. 14 is a partially cut-away perspective view of a heat exchanger for a vehicle according to another exemplary embodiment of the present invention.

In another exemplary embodiment of the present invention, the operating fluids includes the coolant flowing from the radiator 20 and the transmission oil flowing from the automatic transmission 40 according to the present exemplary embodiment. The coolant and the transmission oil are heat exchanged with each other in the heat exchanger 100 such that a temperature of the transmission oil is controlled.

The heat exchanger 100, as shown in FIG. 11 to FIG. 13, includes the heat radiating portion 210 and the bifurcating portion 220, and the heat radiating portion 210 and the bifurcating portion 220 will be described in detail.

The heat radiating portion 210 is formed by stacking a plurality of plates 211, and a plurality of connecting lines 213 is formed between the neighboring plates 211. In addition, the coolant flows through one of the neighboring connecting lines 213, and the transmission oil flows through the other of the neighboring connecting lines 213. At this time, heat is exchanged between the coolant and the transmission oil.

The heat radiating portion 210 exchanges heat between the coolant and the transmission oil through counterflow of the coolant and the transmission oil.

The heat radiating portion 210 is a heat radiating portion of plate type (or disk type) where the plurality of plates 211 is stacked.

In addition, the bifurcating portion 220 connects one of inflow holes 215 for flowing the operating fluids into the heat radiating portion 210 with one of exhaust holes 217 for discharging the operating fluids from the heat radiating portion 210, and is mounted at an exterior of the heat radiating portion 210. The bifurcating portion 220 is configured for the operating fluid to bypass the heat radiating portion 210 without passing through the connecting lines 213 according to a flow amount of the operating fluid.

The bifurcating portion 220 connects any one of the inflow holes 215 with any one of the exhaust holes 217 in the heat radiating portion 210. That is, a portion of the inflow holes 215 is connected to a portion of the exhaust holes 217 through the connecting lines 213, and another portion of the inflow holes 215 is connected to another portion of the exhaust holes 217 through the connecting lines 213 and the bifurcating portion 220.

The inflow holes 215 includes first and second inflow holes 215a and 215b formed at both sides of the surface of the heat radiating portion 210 along the length direction according to the present exemplary embodiment.

In addition, the exhaust holes 217 includes first and second exhaust holes 217a and 217b formed at the both sides of the surface of the heat radiating portion 210 along the length direction. The first and second exhaust holes 217a and 217b correspond to the first and second inflow holes 215a and 215b and are distanced from the first and second inflow holes 215a and 215b. The first and second exhaust holes 217a and 217b are connected respectively to the first and second inflow holes 215a and 215b through the respective connecting line 213 in the heat radiating portion 210.

The first inflow hole 215a and the first exhaust hole 217a are formed at corner portions of the surface of the heat radiating portion 210 diagonally.

The second inflow hole 215b and the second exhaust hole 217b are formed at corner portions of the surface of the heat radiating portion 210 diagonally, and confronts respectively with the first inflow hole 215a and the first exhaust hole 217a.

The bifurcating portion 220 connects the first inflow hole 215a with the first exhaust hole 217a, and is protruded from the surface of the heat radiating portion 210.

According to the present exemplary embodiment, the coolant circulates through the first inflow hole 215a and the first exhaust hole 217a, and the transmission oil circulates through the second inflow hole 215b and the second exhaust hole 217b.

Connecting ports are mounted respectively at the first inflow hole 215a and the first exhaust hole 217a, and are connected to the radiator 20 through connecting hoses connected to the connecting ports. In addition, connecting ports are mounted respectively at the second inflow hole 215b and the second exhaust hole 217b, and are connected to the automatic transmission 40 through connecting hoses connected to the connecting ports.

The connecting line includes a first connecting line 213a through which the coolant flows and a second connecting line 213b through with the transmission oil passes according to the present exemplary embodiment. The first connecting line 213a and the second connecting line 213b are formed alternately.

The bifurcating portion 220 includes a bypass line 221. The bypass line 221 is adapted to exhaust the coolant flowing in the bifurcating portion 220 through the first inflow hole 215a to the first exhaust hole 217a directly.

If the flow amount of the coolant flowing in through the first inflow hole 215a is small, the bypass line 221 does not flow the coolant into the first connecting line 213a of the heat radiating portion 210 but exhausts the coolant directly into the first exhaust hole 217a.

If the transmission oil should be warmed up according to the condition or the mode of the vehicle such as the running state, the idle mode, or the initial starting, the bypass line 221 prevents the coolant from flowing into the first connecting line 213a. Therefore, it is prevented that the temperature of the transmission oil is lowered through heat exchange with the coolant.

If the flow amount of the coolant, on the contrary, is large, the coolant flows into the first connecting line 213a as well as the bypass line 221. At this time, the transmission oil is flowed into the second connecting line 213b from the automatic transmission 40 through the second inflow hole 215b. Therefore, the coolant passing through the first connecting line 213a and the transmission oil passing through the second connecting line 213b are heat exchanged with each other in the heat radiating portion 210.

Therefore, the transmission oil is cooled through heat exchange with the coolant in the heat radiating portion 210 and is then supplied to the automatic transmission 40.

That is, since the heat exchanger 100 supplies the cooled transmission oil to the automatic transmission 40 rotating at a high speed, occurrence of slip in the automatic transmission 40 is prevented.

If the heat exchanger 100 according to another exemplary embodiment of the present invention is applied, the operating fluids can be warmed up and cooled simultaneously by using the flow amount of the operating fluids at the running state or the initial starting condition of the vehicle. Therefore, the temperatures of the operating fluids can be controlled efficiently.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A heat exchanger for a vehicle, comprising:
a heat radiating portion provided with first and second connecting lines formed alternately by stacking a plurality of plates, and receiving first and second operating fluids into the first and second connecting lines respectively, the first and second operating fluids heat-exchanging with each other during passing through the first and second connecting lines;
a bifurcating portion fluid-connecting an inflow hole for flowing one operating fluid of the first and second operating fluids with an exhaust hole for exhausting the one operating fluid, and adapted for the one operating fluid to bypass the heat radiating portion according to a temperature of the one operating fluid; and
a valve unit mounted corresponding to the inflow hole and adapted to flow the one operating fluid selectively to the heat radiating portion or the bifurcating portion according to the temperature of the one operating fluid flowing in the inflow hole,
wherein the first operating fluid flows into the heat radiating portion through a first inflow hole and flows out from the heat radiating portion through a first exhaust hole, and the first inflow hole is connected to the first exhaust hole through the first connecting line,
wherein the second operating fluid flows into the heat radiating portion through a second inflow hole and flows out from the heat radiating portion through a second exhaust hole, and the second inflow hole is connected to the second exhaust hole through the second connecting line,
wherein the first and second inflow holes are formed at both sides of a surface of the heat radiating portion along a length direction of the heat radiating portion,
wherein the first and second exhaust holes are distanced from the first and second inflow holes and are formed at the both sides of the surface of the heat radiating portion along the length direction of the heat radiating portion,
wherein the valve unit includes a mounting cap fixedly mounted at the other end of the heat radiating portion corresponding to the first inflow hole, and a deformable member inserted in the mounting cap and adapted to extend or contract in the first inflow hole according to the temperature of the operating fluid, wherein the deformable member is formed by overlapping and contacting a plurality of ring members with each other in a coil spring shape, and wherein the one operating fluid flowing into the inflow hole flows to the bifurcating portion when two adjacent ones of the ring members directly contact with each other such that a gap between the two adjacent ring members is closed and thus the two adjacent ring members themselves physically seal the first connecting line of the heat radiating portion, and the one operating fluid flows into the first connecting line of the heat radiating portion through the gap between the two adjacent ones of the ring members when the two adjacent ones of the ring members are spaced apart from each other, wherein the ring members directly contact with each other as the temperature of the one operating fluid increases and separate as the temperature of the one operating fluid decreases.

2. The heat exchanger of claim 1, wherein the bifurcating portion connects the first inflow hole with the first exhaust hole, and is protruded from a surface of the heat radiating portion.

3. The heat exchanger of claim 1, wherein the first inflow hole and the first exhaust hole are formed at corner portions of the surface of the heat radiating portion facing diagonally with each other.

4. The heat exchanger of claim 1, wherein the second inflow hole and the second exhaust hole are formed at corner portions of the surface of the heat radiating portion at which the first inflow hole and the first exhaust hole are not positioned and which face diagonally with each other.

5. The heat exchanger of claim 1, wherein the first operating fluid is a coolant coming from a radiator and the second operating fluid is a transmission oil coming from an automatic transmission.

6. The heat exchanger of claim 5, wherein the coolant circulates through the first inflow hole, the first connecting line, and the first exhaust hole, and the transmission oil circulates through the second inflow hole, the second connecting line, and the second exhaust hole.

7. The heat exchanger of claim 6, wherein the bifurcating portion is provided with a bypass line bifurcated from the first inflow hole and adapted to flow the coolant flowing in the bifurcating portion through the first inflow hole to the first exhaust hole directly.

8. The heat exchanger of claim 1, wherein the deformable member is made from shape memory alloy adapted to extend or contract according to the temperature of operating fluid.

9. The heat exchanger of claim 1, wherein the deformable member includes:
   a pair of fixed portions positioned at both sides of the deformable member in a length direction of the deformable member and adapted not to being deformed according to the temperature of the operating fluid; and
   a deformable portion disposed between the pair of fixed portions and adapted to extend or contract according to the temperature of the operating fluid.

10. The heat exchanger of claim 1, wherein the mounting cap includes:
    a mounting portion fixedly mounted at the heat radiating portion; and
    a guide portion extending from the mounting portion toward the first inflow hole and adapted to guide the deformable member in a case that the deformable member inserted therein is deformed.

11. The heat exchanger of claim 10, wherein a screw is formed at an exterior circumference of the mounting portion so as to be threaded to the heat radiating portion.

12. The heat exchanger of claim 10, wherein at least one of through-holes is formed at an exterior circumference of the guide portion to deliver the operating fluid therethrough.

13. The heat exchanger of claim 10, further including a sealing for preventing the operating fluid passing through the heat radiating portion from leaking to the exterior,
    wherein the sealing is mounted between the mounting portion and the guide portion.

14. The heat exchanger of claim 1, wherein the heat radiating portion heat-exchanges the first and second operating fluids by counterflow of the first and second operating fluids.

* * * * *